United States Patent
Lee et al.

(10) Patent No.: US 10,714,716 B2
(45) Date of Patent: Jul. 14, 2020

(54) SEALING APPARATUS FOR SECONDARY BATTERY

(71) Applicant: LG CHEM, LTD., Seoul (KR)

(72) Inventors: Sang Kyun Lee, Daejeon (KR); Cha Hun Ku, Daejeon (KR)

(73) Assignee: LG Chem, Ltd. (KR)

( * ) Notice: Subject to any disclaimer, the term of this patent is extended or adjusted under 35 U.S.C. 154(b) by 85 days.

(21) Appl. No.: 15/737,356

(22) PCT Filed: Oct. 11, 2016

(86) PCT No.: PCT/KR2016/011374
§ 371 (c)(1),
(2) Date: Dec. 18, 2017

(87) PCT Pub. No.: WO2017/099344
PCT Pub. Date: Jun. 15, 2017

(65) Prior Publication Data
US 2018/0175337 A1     Jun. 21, 2018

(30) Foreign Application Priority Data

Dec. 11, 2015 (KR) .................. 10-2015-0177259

(51) Int. Cl.
*H01M 2/08* (2006.01)
*H01M 2/02* (2006.01)
(Continued)

(52) U.S. Cl.
CPC .......... *H01M 2/08* (2013.01); *H01M 2/0207* (2013.01); *H01M 2/04* (2013.01); *H01M 10/04* (2013.01)

(58) Field of Classification Search
None
See application file for complete search history.

(56) References Cited

U.S. PATENT DOCUMENTS

| 7,749,648 B2 | 7/2010 | Kim |
| 2006/0093905 A1 | 5/2006 | Kim |
| | (Continued) | |

FOREIGN PATENT DOCUMENTS

| JP | 2001-229889 A | 8/2001 |
| JP | 2004-87239 A | 3/2004 |
| | (Continued) | |

OTHER PUBLICATIONS

International Search Report (PCT/ISA/210) issued in PCT/KR2016/011374, dated Jan. 18, 2017.
(Continued)

*Primary Examiner* — Jonathan Crepeau
(74) *Attorney, Agent, or Firm* — Lerner, David, Littenberg, Krumholz & Mentlik, LLP

(57) ABSTRACT

The present invention relates to a sealing apparatus for a secondary battery, which seals a sealing part of a case in which an electrode assembly and an electrolyte are accommodated, and the sealing apparatus comprises a sealing member comprising a first sealing piece and a second sealing piece, which thermally fuse a surface of the sealing part to seal the sealing part, wherein the first sealing piece and the second sealing piece comprise a plurality of thermal fusion parts, which are disposed from an outer end of a surface of the sealing part toward an inner end that is opposite to the outer end to thermally fuse the surface of the sealing part, and non-thermal fusion parts, which are disposed between the plurality of thermal fusion parts and do not seal the surface of the sealing part.

5 Claims, 4 Drawing Sheets

(51) Int. Cl.
*H01M 2/04* (2006.01)
*H01M 10/04* (2006.01)

(56) References Cited

U.S. PATENT DOCUMENTS

| | | |
|---|---|---|
| 2013/0189570 A1 | 7/2013 | Park et al. |
| 2014/0004410 A1 | 1/2014 | Park et al. |
| 2015/0000117 A1 | 1/2015 | Cho et al. |

FOREIGN PATENT DOCUMENTS

| | | |
|---|---|---|
| JP | 2006-093120 A | 4/2006 |
| JP | 2008-021634 A | 1/2008 |
| JP | 2008-198484 A | 8/2008 |
| KR | 10-0958849 B1 | 6/2010 |
| KR | 10-2013-0080071 A | 7/2013 |
| KR | 10-1452021 B1 | 10/2014 |
| KR | 10-1527124 B1 | 6/2015 |
| KR | 10-2015-0110983 A | 10/2015 |
| KR | 10-2015-0125263 A | 11/2015 |

OTHER PUBLICATIONS

European Search Report for Appl. No. 16873210.5 dated Feb. 13, 2018.

SEALING APPARATUS FOR SECONDARY BATTERY

CROSS-REFERENCE TO RELATED APPLICATION

The present application claims the benefit of the priority of Korean Patent Application No. 10-2015-0177259, filed on Dec. 11, 2015, which is hereby incorporated by reference in its entirety.

TECHNICAL FIELD

The present invention relates to a sealing apparatus for a secondary battery, which seals a sealing part of a case in which an electrode assembly and an electrolyte are accommodated.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

Referring to FIG. 1, a secondary battery according to the related art comprises an electrode assembly 30, an electrolyte, and a case 20 accommodating the electrode 30 and the electrolyte. The case 20 comprises an accommodation part accommodating the electrolyte and a sealing part 22 sealing the accommodation part 21.

Here, the sealing part 22 is thermally fused to be sealed. Here, a sealing apparatus 10 is used. That is, the sealing apparatus 10 applies heat and a pressure to top and bottom surfaces of the sealing part 22 at the same time to seal the sealing part 22.

However, in the sealing apparatus according to the related art, when the heat and the pressure are applied to the sealing part 22 to seal the sealing part 22, a sealant layer 22a disposed inside the sealing part 22 may be melted and simultaneously leak to the outside of the sealing part 22. Thus, the sealing part 22 may be reduced in thickness to deteriorate sealability. Particularly, when the melted sealant layer 22a leaks to the accommodation part 21, a "protrusion area" may be formed as illustrated in FIG. 1. As a result, when the "protrusion area" comes into contact with the electrode assembly 30, fire and explosion due to short circuit may occur. (where the protrusion area is called an area that protrudes to be projected to the outside)

The present invention is invented to solve the above-described problem, and an object of the present invention is to provide a sealing apparatus for a secondary battery, which prevents a sealing part 22 from being reduced in thickness to improve seal strength, and particularly, prevents a sealant layer 22a of the sealing part 22 from leaking to an accommodation part 21 to prevent a protrusion area from being formed.

Technical Solution

To achieve the above-described object, a sealing apparatus for a secondary battery, which seals a sealing part of a case in which an electrode assembly and an electrolyte are accommodated, according to the present invention comprises: a sealing member comprising a first sealing piece and a second sealing piece, which thermally fuse a surface of the sealing part to seal the sealing part, wherein the first sealing piece and the second sealing piece comprise a plurality of thermal fusion parts, which are disposed from an outer end of a surface of the sealing part toward an inner end that is opposite to the outer end to thermally fuse the surface of the sealing part, and non-thermal fusion parts, which are disposed between the plurality of thermal fusion parts and do not seal the surface of the sealing part.

Each of the non-thermal fusion parts may be provided as an opening groove that is opened in a direction of the surface of the sealing part.

The non-thermal fusion part of the first sealing piece and the non-thermal fusion part of the second sealing piece may be disposed to correspond to each other.

The thermal fusion part disposed on the inner end of the sealing part may have an upward inclined surface that is inclined toward the inner end of the sealing part, and the upward inclined surface may gradually decrease pressing force toward the inner end of the sealing part to deform a width of the inner end of the sealing part so that the width gradually increases.

The thermal fusion part disposed on the outer end of the sealing part may have a downward inclined surface that is inclined toward the outer end of the sealing part, and the downward inclined surface may gradually increase pressing force toward the outer end of the sealing part to deform a shape of the outer end of the sealing part into a sharp shape.

The sealing apparatus may further comprise a welding member that welds the outer end of the sealing part to seal the sealing part.

The welding member may use ultrasonic welding or laser welding.

Advantageous Effects

The present invention has effects as follows.

First: the sealing apparatus of the secondary battery according to the present invention may comprise the non-thermal fusion part, which interrupts the sealant layer provided in the sealing part of the case so that the sealant layer does not move to the inside of the case, to prevent the protrusion area from being formed, thereby previously preventing the accident due to the short circuit from occurring.

Second: in the sealing apparatus of the secondary battery according to the present invention, the non-thermal fusion part may be provided as the opening groove to realize the easiness in manufacturing.

Third: in the sealing apparatus of the secondary battery according to the present invention, the inclined surface that is inclined downward may be formed on the thermal fusion part disposed on the outer end of the sealing part to deform the shape of the outer end of the sealing part into the sharp shape, thereby improving the sealability.

Fourth: in the sealing apparatus of the secondary battery according to the present invention, the inclined surface that is inclined upward may be formed on the thermal fusion part disposed on the inner end of the sealing part so that the inner end of the sealing part gradually decreases in width, thereby significantly preventing the protrusion area to the inside of the case from occurring.

BRIEF DESCRIPTION OF THE DRAWINGS

FIGS. 3 and 4 are views illustrating a sealed state in the sealing apparatus according to the present invention, wherein FIG. 3 is a view illustrating a sealed state of a sealing member, and FIG. 4 is a view illustrating a welded state of a welding member.

MODE FOR CARRYING OUT THE INVENTION

Figure 1:
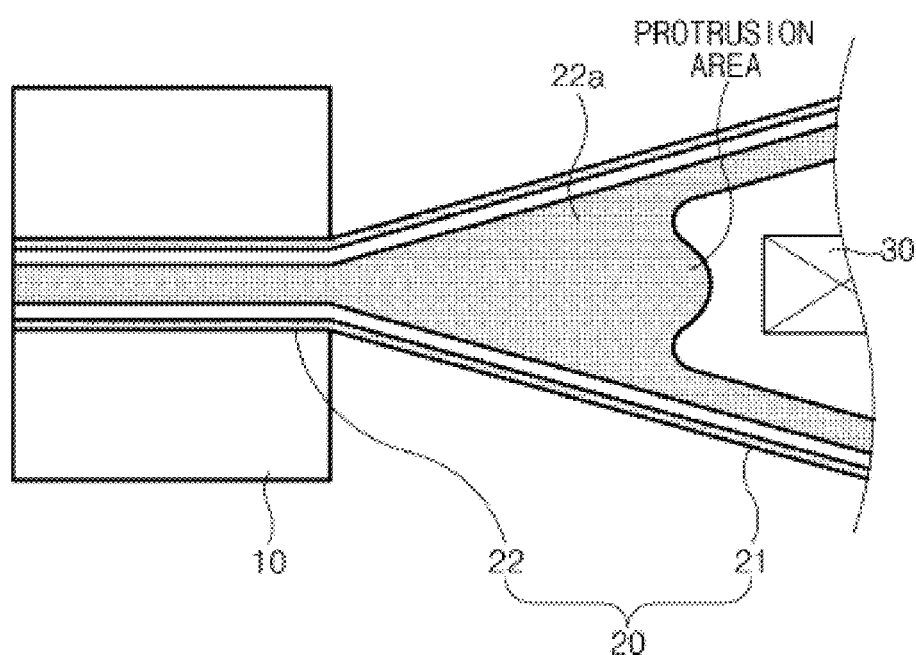
FIG. 1 is a view of a sealing apparatus for a secondary battery according to a related art.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 2:
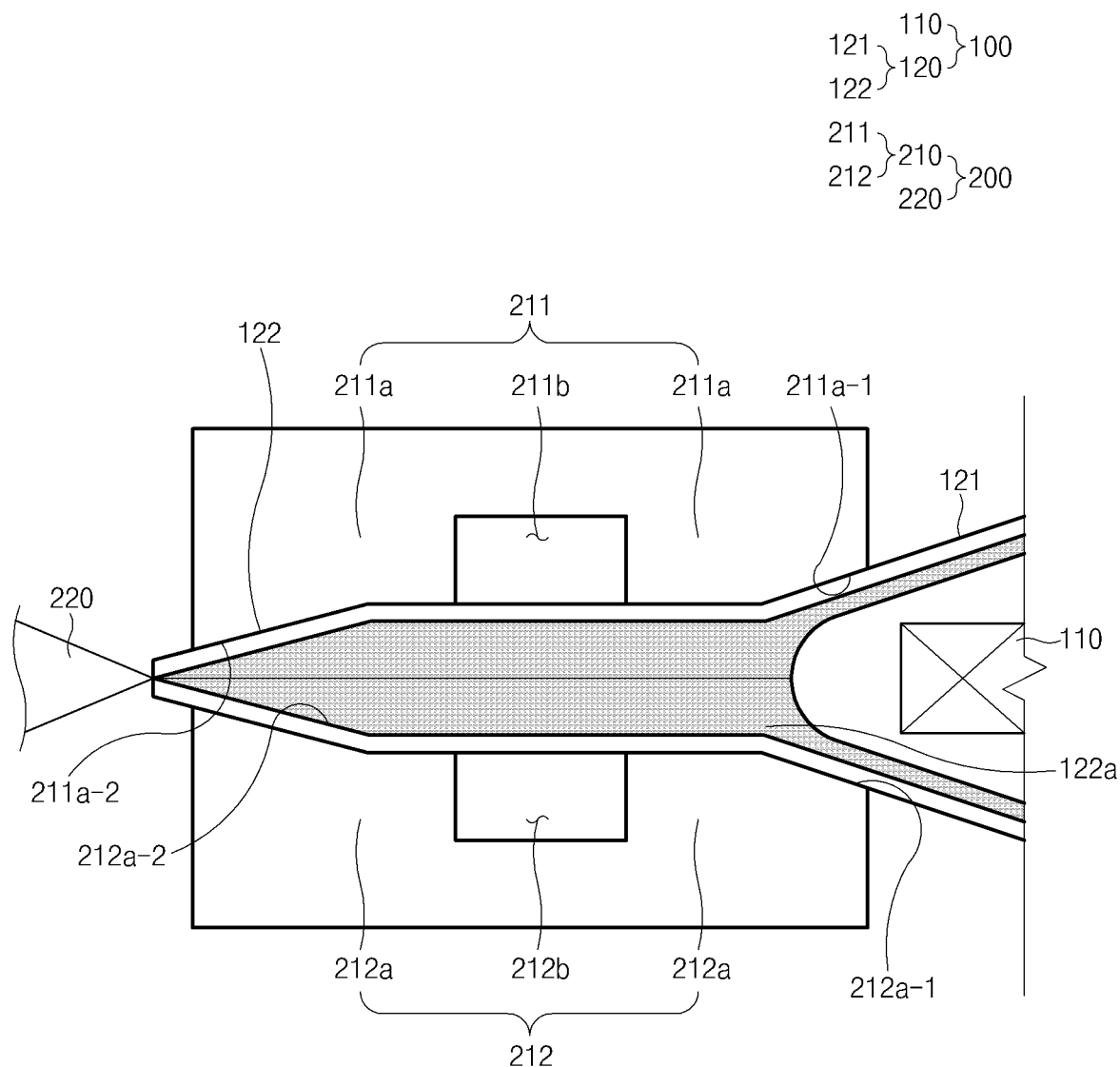
FIG. 2 is a view of a sealing apparatus for a secondary battery according to the present invention.

Referring to FIG. 2, a secondary battery 100 comprises an electrode assembly 110, an electrolyte (not shown), and a case 120 in which the electrode assembly 110 and the electrolyte are accommodated. The case 120 comprises an accommodation part 121 in which the electrolyte is accommodated and a sealing part 122 disposed along an edge of the accommodation part 121 to seal the accommodation part 121.

Here, the case 120 comprises an upper case and a lower case. The upper case and the lower case are coupled to each other to accommodate the electrode assembly 110 and the electrolyte.

That is, an accommodation groove of the upper case and an accommodation groove of the lower case are coupled to each other to provide the accommodation part 121 accommodating the electrode assembly 110 and the electrolyte. A sealing surface of the upper case and a sealing surface of the lower case are sealed to provide the sealing part 122 for sealing the accommodation part 121.

Also, the case 120 comprises an outer sheath layer made of an insulation material and disposed on an outer surface of the case 120, an intermediate layer made of aluminum or SUS, and a sealant layer 122*a* made of a thermal adhesion material and disposed on an inner surface of the case 120.

The sealing part 122 of the case 120 is thermally fused to be sealed. Here, the sealing apparatus 200 according to the present invention is used. Thus, the sealing apparatus 200 improves sealing strength of the sealing part 122, and particularly, prevents the sealant layer 122*a* of the sealing part 122 from leaking to the accommodation part 121 to prevent a protrusion area (see FIG. 1) from being generated.

That is, when the sealing part 122 of the case 120 is excessively sealed, the sealant layer 122*a* disposed inside the sealing part 122 is excessively melted to leak to the outside of the sealing part 122. Thus, the sealing part 122 is reduced in thickness to deteriorate the sealing strength. Particularly, when the sealant layer 122*a* leaks to the accommodation part 121, the protrusion area may be generated.

To solve the above-described problem, the sealing apparatus 200 for the secondary battery according to the present invention may prevent the sealant layer 122*a* from leaking to the outside of the sealing part 122 even though the sealing part 122 is sealed, particularly, excessively sealed, thereby preventing the protrusion area from being generated.

Hereinafter, in the sealing part 122, an end connected to the accommodation part 121 is called an inner end (a right end connected to the accommodation part when viewed in FIG. 2), and an end opposite to the inner end is called an outer end (a left end of the sealing part when viewed in FIG. 2).

For example, as illustrated in FIG. 2, the sealing apparatus 200 for the secondary battery according to the present invention comprises a sealing member 210 that thermally fuses a surface of the sealing part 122 of the case 120 to seal the sealing part 122 and a welding member 220 that welds the outer end of the sealing part 122 of the case 120 to seal the sealing part 122.

The sealing member 210 comprises a first sealing piece 211 and a second sealing piece 212, which thermally fuse top and bottom surfaces of the sealing part 122 at the same time to seal the sealing pat 122.

The first sealing piece 211 and the second sealing piece 212 are disposed symmetrical to each other. That is, the first sealing piece 211 and the second sealing piece 212 may comprise a plurality of thermal fusion parts 211*a* and 212*a*, which are disposed from the inner end of the sealing part 122 toward the outer end of the sealing part 122 to thermally fuse the sealing part 122 in multistage, and non-thermal fusion parts 211*b* and 212*b*, which are disposed between the plurality of thermal fusion parts 211*a* and 212*a* and do not seal the sealing part 122.

That is, in the first sealing piece 211 and the second sealing piece 212, the sealant layer 122*a* on the surface of the sealing part 122, on which the plurality of thermal fusion parts 211*a* and 212*a* are disposed, may be sealed while being melted by the heat and the pressure, and the sealant layer 122*a* on the surface of sealing part 122, on which the non-thermal fusion parts 211*b* and 212*b* are disposed, may not be sealed while being maintained as it is because the heat and the pressure are not applied. Here, the sealant layer 122*a* that is not sealed may prevent the melted sealant layer 122*a* from being connected and agglomerated to each other, thereby significantly preventing the sealing layer 122*a* from leaking to the outside of the sealing part 122.

That is, the sealing strength may be improved by the plurality of sealant layers 122*a*, which are melted by the plurality of thermal fusion parts 211*a* and 212*a*, and the leakage of the melted sealant layer 122*a* to the outside of the sealing part 122 may be prevented by the sealant layer 122*a*, which is not melted by the non-thermal fusion parts 211*b* and 212*b*. Thus, the sealing strength may be improved, and also, the protrusion area may not be generated.

Here, the non-thermal fusion part 211*b* of the first sealing piece 211 and the non-thermal fusion part 212*b* of the second sealing piece 212 may be disposed to correspond to each other, thereby significantly preventing the melted sealant layer 122*a* from moving.

Figure 3:
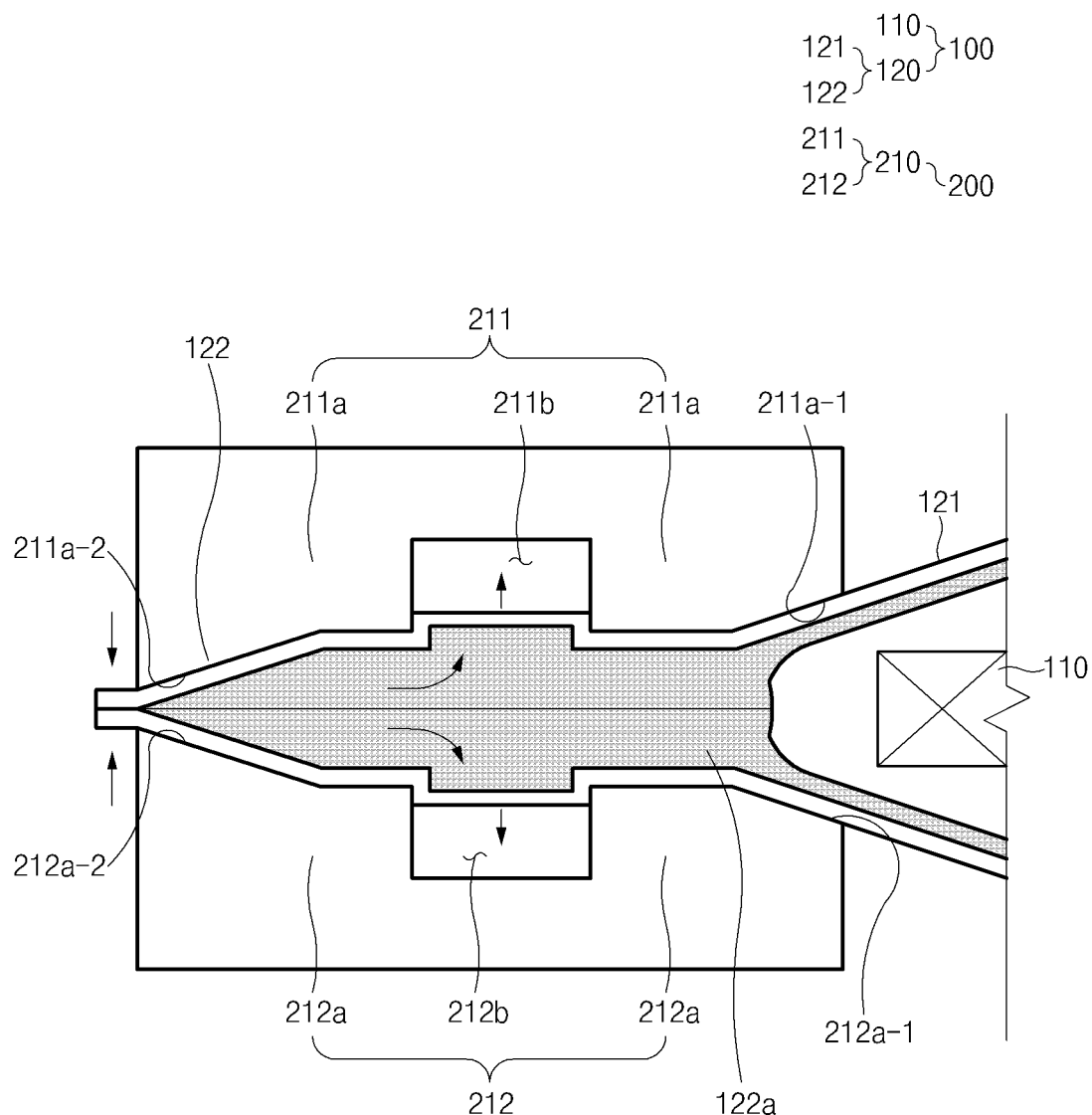

As illustrated in FIG. 3, each of the non-thermal fusion parts 211*b* and 212*b* is provided as an opening groove that is opened in a direction of the sealing part 122. That is, the sealing part 122, which is not pressed by the non-thermal fusion parts 211*b* and 212*b* that are the opening grooves, may be projected to significantly preventing the sealant layer 122*a* from leaking to the outside.

Also, upward inclined surfaces 211*a*-1 and 212*a*-1 that are inclined upward toward the inside of the sealing part 122 are disposed on the thermal fusion parts 211*a* and 212*a* disposed on the inner end of the sealing part 122. The upward inclined surfaces 211*a*-1 and 212*a*-1 may gradually decrease the pressing force toward the inner end of the sealing part 122 to deform a width of the inner end of the sealing part 122 so that the width gradually increases, thereby significantly preventing the sealing layer 122a disposed on the inner end of the sealing part 122 from leaking to the outside.

Also, downward inclined surfaces 211a-2 and 212a-2 that are inclined downward toward the outside of the sealing part 122 are disposed on the thermal fusion parts 211a and 212a disposed on the outer end of the sealing part 122. The downward inclined surfaces 211a-2 and 212a-2 may gradually increase the pressing force toward the outer end of the sealing part 122 to deform a shape of the outer end of the sealing part 122 into a sharp shape, thereby improving sealability of the end of the sealing part 122.

Figure 4:
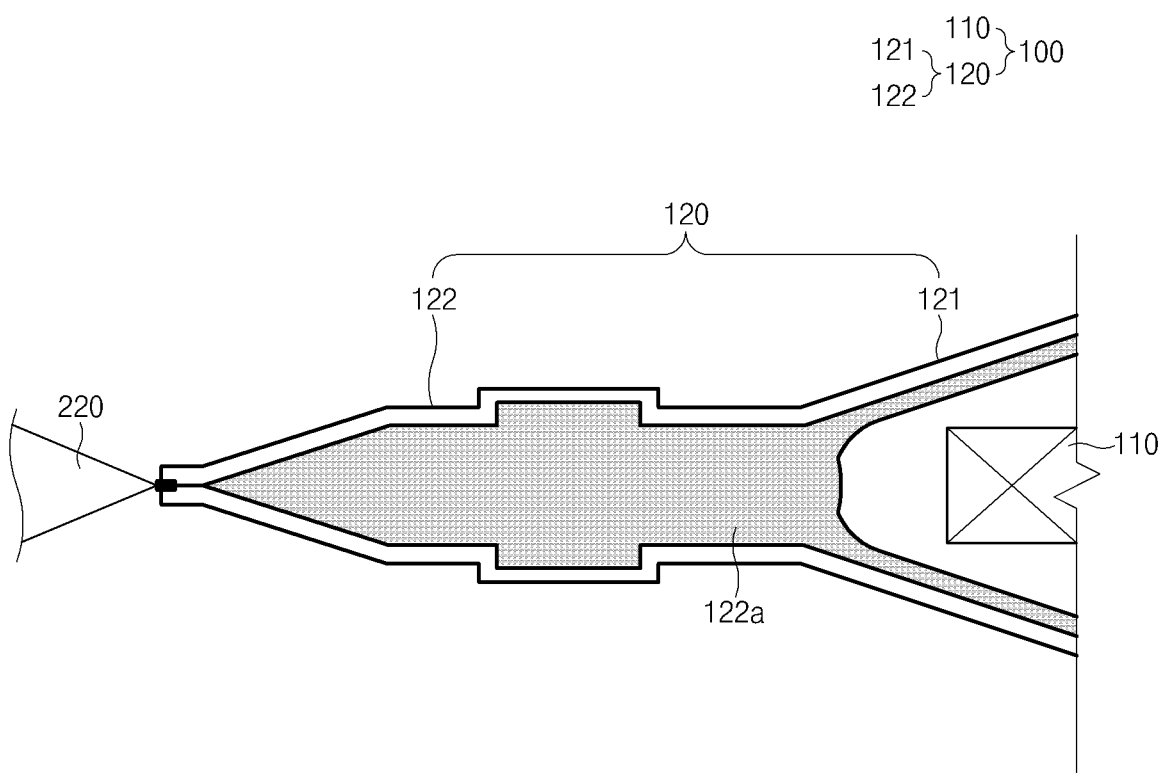

As illustrated in FIG. 4, the welding member 220 may weld the outer end of the sealing part 122 to seal the sealing part 122, thereby improving the sealing strength of the sealing part 122 together with the sealing member 210. The welding member 220 may use ultrasonic welding or laser welding.

In the sealing apparatus 200 for the secondary battery according to the present invention, the sealing strength of the sealing part 122 may be improved to prevent the protrusion area from being generated.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A sealing apparatus in combination with a secondary battery, which seals a sealing part of a case in which an electrode assembly and an electrolyte are accommodated, the sealing apparatus comprising:
    a sealing member comprising a first sealing piece and a second sealing piece, which thermally fuse a surface of the sealing part to seal the sealing part,
    wherein the first sealing piece and the second sealing piece comprise a plurality of thermal fusion parts, which are disposed from an outer end of a surface of the sealing part toward an inner end that is opposite to the outer end to thermally fuse the surface of the sealing part, and non-thermal fusion parts, which are disposed between the plurality of thermal fusion parts and do not seal the surface of the sealing part,
    wherein the thermal fusion part disposed on the inner end of the sealing part has an upward inclined surface that is inclined toward the inner end of the sealing part, and the upward inclined surface gradually decreases pressing force toward the inner end of the sealing part to deform a width of the inner end of the sealing part so that the width gradually increases to prevent a sealing layer disposed on the inner end of the sealing part from leaking to outside,
    wherein the thermal fusion part disposed on the outer end of the sealing part has a downward inclined surface that is inclined toward the outer end of the sealing part, and the downward inclined surface gradually increases pressing force toward the outer end of the sealing part to deform a shape of the outer end of the sealing part into a sharp shape, and
    wherein the sealing part has a flat, non-projected surface adjacent to the non-thermal fusion parts.

2. The sealing apparatus of claim 1, wherein each of the non-thermal fusion parts is provided as an opening groove that is opened in a direction of the surface of the sealing part.

3. The sealing apparatus of claim 1, wherein the non-thermal fusion part of the first sealing piece and the non-thermal fusion part of the second sealing piece are disposed to correspond to each other.

4. The sealing apparatus of claim 1, further comprising a welding member that welds the outer end of the sealing part to seal the sealing part.

5. The sealing apparatus of claim 4, wherein the welding member uses ultrasonic welding or laser welding.

* * * * *